US009519621B2

(12) United States Patent
Pravetz et al.

(10) Patent No.: US 9,519,621 B2
(45) Date of Patent: Dec. 13, 2016

(54) DETERMINISTIC RENDERING OF ACTIVE CONTENT

(75) Inventors: James D. Pravetz, Sunnyvale, CA (US); Richard Cohn, Newton, MA (US); William Ie, Mountain View, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 2618 days.

(21) Appl. No.: 11/479,849

(22) Filed: Jun. 30, 2006

(65) Prior Publication Data

US 2008/0005670 A1  Jan. 3, 2008

(51) Int. Cl.
    G06F 17/00    (2006.01)
    G06F 17/21    (2006.01)
    G06F 21/64    (2013.01)

(52) U.S. Cl.
    CPC ............ *G06F 17/211* (2013.01); *G06F 21/64* (2013.01)

(58) Field of Classification Search
    USPC ........ 715/243, 239, 249, 230, 234; 713/176
    See application file for complete search history.

(56) References Cited

U.S. PATENT DOCUMENTS

| 8,145,908 | B1 * | 3/2012 | Liu et al. ....................... | 713/176 |
| 2001/0044797 | A1 * | 11/2001 | Anwar ........................... | 707/102 |
| 2003/0028561 | A1 * | 2/2003 | Gounares et al. ............ | 707/513 |
| 2003/0221105 | A1 * | 11/2003 | Bajaj ............................. | 713/176 |
| 2004/0158717 | A1 * | 8/2004 | Cox .............................. | 713/176 |
| 2004/0250099 | A1 * | 12/2004 | Pravetz et al. ................ | 713/193 |
| 2005/0198692 | A1 * | 9/2005 | Zurko et al. .................... | 726/24 |
| 2005/0268221 | A1 * | 12/2005 | Shur et al. .................... | 715/513 |
| 2007/0174766 | A1 * | 7/2007 | Rubin et al. .................. | 715/530 |

FOREIGN PATENT DOCUMENTS

| EP | 1873655 A2 | 12/2009 |
| EP | 1873655 A3 | 12/2009 |

OTHER PUBLICATIONS

Alsaid, A., et al., "Dynamic content attacks on digital signatures", *Information management & computer security*, 13(4), (2005), 328-336.

Kain, K., et al., "Digital signatures and electronic documents: a cautionary tale", *IFIP Conference Proceedings;* vol. 228, *Proceedings of the IFIP TC6/TC11 Sixth Joint Working Conference on Communications and Multimedia Security: Advanced Communications and Multimedia Security*, (2002), 293-308.

Kubbilun, W., et al., "Trustworthy Verification and Visualisation of Multiple XML-Signatures", *Lecture Notes in Computer Science, Communications and Multimedia Security*, vol. 3677/2005, (2005), 311-320.

Neubauer, T., et al., "Digital Signatures with Familiar Appearance for e-Government Documents: Authentic PDF", *The First International Conference on Availability, Reliability and Security, ARES 2006*, (2006), 723-731.

* cited by examiner

*Primary Examiner* — Mohammed-Ibrahim Zuberi
(74) *Attorney, Agent, or Firm* — Shook, Hardy & Bacon, L.L.P.

(57) ABSTRACT

Active content is deterministically rendered in a stable format that is independent of any particular targeted environment, which the active content may subsequently be rendered to. Environmental and dynamic dependencies are removed from a specification associated with the active content for purposes of producing a stable and consistent specification for the active content. The stable and static specification is used to subsequently render the active content into the stable format for any targeted or desired environment.

15 Claims, 4 Drawing Sheets

DETERMINISTIC RENDERING OF ACTIVE CONTENT

FIELD

This application relates to data processing and in particular to techniques for the deterministically rendering of active content.

BACKGROUND

Increasingly documents are being natively created and subsequently stored in an electronic environment. Reliance on paper-based media is on the decline. In the past, important documents (e.g., legal, work related documents, etc.) were almost exclusively produced on paper and subsequently stored in filing cabinets, court libraries, safety deposit boxes, etc. This is no longer exclusively the case as more and more electronic documents are being admitted into court proceedings as evidence and being relied upon by individuals and enterprises as master versions of their contracts, wills, deeds, papers of incorporation, titles, and other important documents.

One problem associated with relying on electronic versions of documents is that often documents may be stored in electronic formats that are readily and easily modified. This is particularly relevant in workflow situations where a document may have counter signatures for approval that is applied to it. Documents may be modifiable in or produced with electronic editors, which permit the contents of the documents to be changed. Furthermore, even some bitmap versions of documents are modifiable within an image editor even though bitmap formats are not generally thought of as capable of being modified. Thus, if a finalized document is capable of being subsequently modified, then there may always exist a question, with any given version of that document, as to whether it is the true finalized version or as to whether it has been subsequently tampered with.

Another issue with relying on electronic versions of documents is that often the native format of the data that comprises the electronic document is associated with inherent variability. That is, many documents are no longer static in nature, such that some aspects of a document are dynamically resolved based on the environment in which they are rendered and/or based on execution of some program logic that may be embedded within the document and executed with the document when it is rendered to a target environment.

So, the same document rendered on different displays, devices, or environments may actually produce different versions of content and/or different visual appearances. For documents signatures, such a situation can be particularly problematic because parties associated with the documents may each assert that they have the proper version or master version; but, each version is in fact different from the other versions either in terms of visual appearance and/or in terms of actual content.

Therefore, although reliance on paper-based media is waning there is still some reluctance and some remaining technical issues associated with completely removing paper dependency from commercial and legal processes.

SUMMARY

According to an embodiment, a method for rendering active content within a document into a stable and environmentally independent format is provided. A document containing an active piece of content is acquired for rendering. Presentation attributes for the content are ensured to be recognizable. Portions of the content that are environmentally dependent are ignored and remaining portions of the content are rendered in a non-modifiable, stable, and/or consistent format.

Other features will be apparent from the accompanying drawings and from the detailed description that follows.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
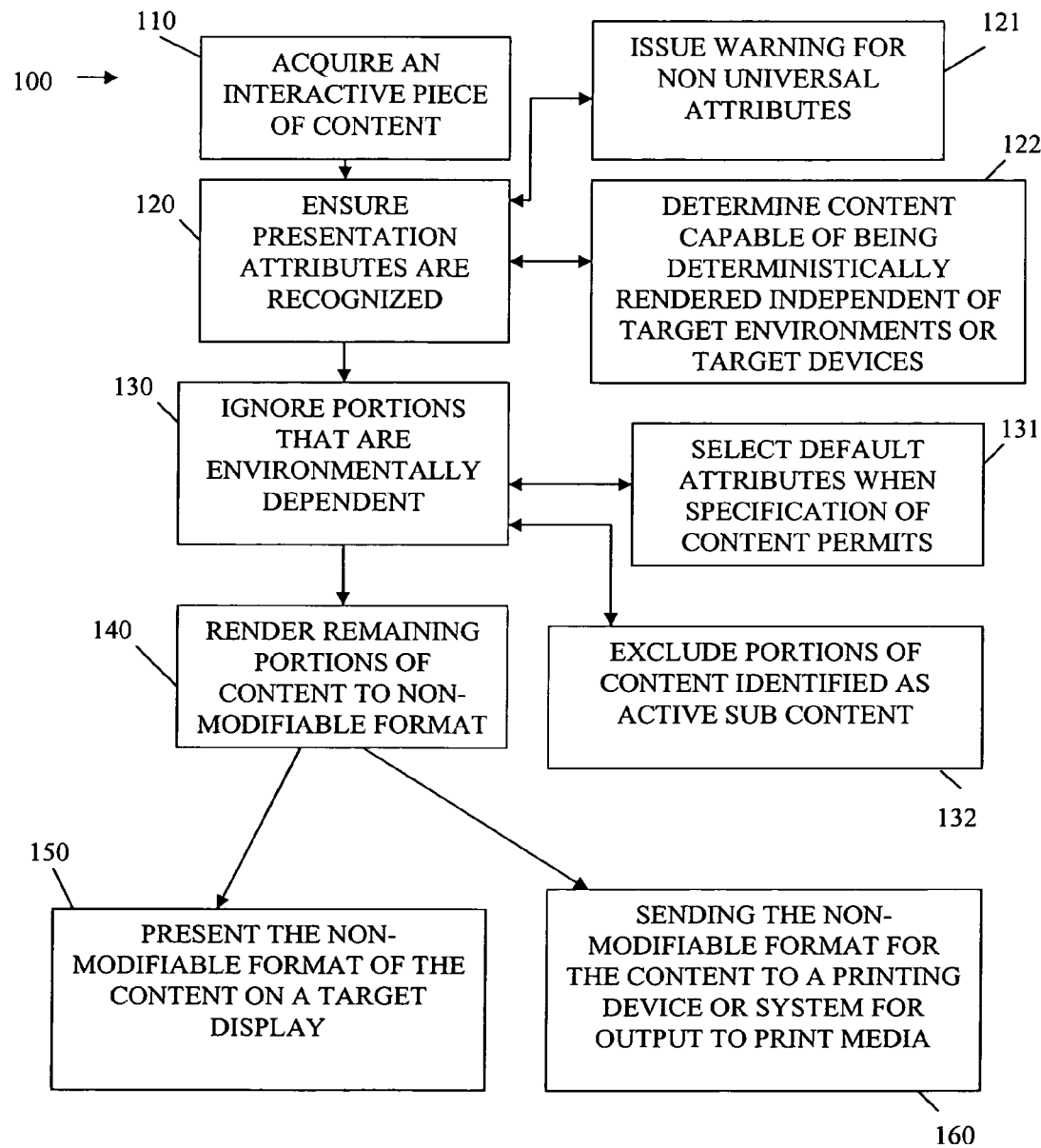
FIG. 1 is a diagram of a method for rendering active content in a non modifiable format, according to an example embodiment of the invention.

In the following description, for purposes of explanation, numerous specific details are set forth in order to provide a thorough understanding of an embodiment of the present invention. It will be evident, however, to one skilled in the art that the present invention may be practiced without these specific details.

As used herein, the term "content" refers to electronic data that is consumed by viewers on displays, devices, automated services, print-based media, or page/display-based media. So, content may refer to data associated with readable text, data associated with graphics, data associated with images, data associated with video, programmatic content, scripts, or data associated with various combinations of each or all of these. Some media may be page/display or view-based, such as World-Wide Web (WWW) formatted or paged media embodied in browsers and accessible over the Internet or modified via editors. Content that is logically related to form a topic, a website, a presentation, or a publication may be referred to as a "document." A "piece of content" refers to all or some subset of defined content. So, content of a document may have a specific header or footer or event section that may be designated as a "piece of content."

The electronic data associated with the content may be represented in a variety of programming or data mark-up languages, such as, but not limited to, Adobe® Portable Document Format (PDF), Hypertext Mark-up Language (HTML), Extensible Mark-up Language (XML), Extensible Style Sheets Language (XSL), Word®, WordPerfect®, JAVA®, ActiveX®, Tag Image File Format TIFF, etc.

"Active Content" refers to a special type of content that is represented by electronic data, which includes at least some data that is dynamic or variable. By variable it is meant that a presentation format for the active content may vary based on an environment or media to which the data is rendered. Variable data may also refer to substantive content (as opposed to presentation content) that is executed dynamically when the active content is rendered to a target environment or media. Active content that is executed when rendered may also be referred to as "active content." Some examples of active content may include, by way of example only, programmatic code, multimedia content, guides drawn on a paged media, embedded JAVA, embedded ActiveX, embedded forms, content specifications that permit fonts or other presentation attributes (e.g., text effects, underlining, bolding, font sizes, font colors, font styles, etc.) to be dynamically resolved based on a context of an environment that the active content is being rendered to, and the like. Moreover, since a document may be viewed as a type of content, some documents may also be properly considered "active documents."

A target "environment" refers to a processing context within which a given piece of content is rendered. So, a target environment may use a specific version of a service and/or a specific version of an operating system (OS) on a specific device or media (e.g., paper, display, browser page, etc.). One environment is considered to be different from another environment when it uses a different version of a same service, a different service altogether, a different version of a same OS, a different OS altogether, or a different device or media. Furthermore, some environmental factors may be outside the content being rendered entirely or external to the content, such as a specific data and time, the identity of a user, information supplied from the user via an active form, information acquired from a storage device, information obtained from a network, and the like. So, the target environment may be broadly stated as a context associated with rendering the content that can be specific to the target environment and to the content that is outside or external to the content entirely.

With this context, the description of various deterministic content rendering services and systems are now described.

FIG. 1 is a diagram of a method 100 for rendering active content in a non-modifiable format, according to an example embodiment of the invention. The method 100 (hereinafter "rendering service") is implemented in a machine-accessible and readable medium and is operational over a network. The network may be wired, wireless, or a combination of wired and wireless.

The rendering service may be implemented within or callable from an existing content viewer or editor. For example, a new feature may be added to the Adobe® Acrobat® product that permits the rendering service to be called. It is to be understood, however, that the rendering service may be a stand alone server-based or client-based service that is activated from within another service or system or that is manually activated. It may also be network independent or network-enabled.

The rendering service is designed to produce a deterministic and non-modifiable format specification for a piece of active content. For example, a PDF signed document may be viewed as a piece of active content for which the rendering service processes against to produce a non-modifiable and stable version of that signed document, such that the stable version is capable of being rendering on a variety of disparate environments and on a variety of disparate devices and it still visually appears the same and includes the same content across environments, across devices, and/or across media. By non-modifiable it is meant that the stable version is not altered or not altered in a manner that would be different from the stable version. So, technically a modification that does not alter the stable version in any manner may occur. The stable version reproduces a consistent version of the content across environments, devices, and platforms.

The technique for achieving this will now be discussed within the processing context of the rendering service with reference to FIG. 1. Accordingly, at 110, the rendering service acquires an active piece of content for rendering. Acquisition may occur in a variety of manners. For example, an existing document that represents the piece of active content may be loaded within a content viewer or content editor when the rendering service is activated, such that the rendering service can identify the name of the piece of content or acquire the data from memory and/or storage associated with the piece of active content. In other cases, the rendering service may actively acquire the piece of active content from storage when instructed to do so using an identifier associated with the piece of active content, such as a file name, etc.

At 120, the rendering service ensures that presentation attributes associated with the active content are recognized by the rendering service. That is, fonts, effects, and other presentation details may include tagging schemes or other descriptions within a specification associated with the active content, and the rendering service determines if those tags or descriptions are acceptable or known to the rendering service. Known presentation attributes may be resolved by the rendering service by checking policies, tables, specifications, or other data structures that define acceptable and known presentation attributes for the rendering service. A presentation attribute is considered acceptable if it can be deterministically rendered across a plurality of disparate environments and/or devices.

According to an embodiment, at 121, the rendering service may also detect that some attributes are known and acceptable; and yet these attributes may still not be universal in their application and usage across some environments or across some devices. For example, some fonts may be deterministically rendered and known across some environments and devices but not across all environments and devices. So, a particular font may appear differently on one device from another device, such as one display screen from another display screen. In such situations, the rendering service may elect to not continue with processing the active content at all or may elect to select a default universal font and issue a warning notification.

At 122, the rendering service determines sub-content included within the active piece of content, which can be deterministically rendered independent of any particular target environment or device. If the rendering service is unsure how some sub-content or presentation attributes associated with the sub-content will be handled within the active piece of content, then the rendering service will exclude the sub-content in question from the rendering. That is, a deterministic rendering is processing that the rendering service is confident will be the same across multiple environments and devices irrespective of processing contexts.

At 130, the rendering service ignores portions of the active content that are environmentally dependent; or, stated another way, that are dependent upon a particular processing context when the active content is rendered to a target environment, device, or media. In some cases, some identified environmentally dependent portions of the sub-content may be, at 131, automatically converted or transformed into environmentally independent attributes by selecting default attributes. So, if a specification for the active piece of content defines some presentation attributes associated with some portions of the sub-content as being selectable depending upon a variety of contexts or environments, then the rendering service may map those available selections to environmentally or context neutral/independent selections. Additionally, at 132, the rendering service actively excludes portions of the active content identified as having active sub-content embedded therein. So, any executable logic included within the active piece of content, which is inherently non deterministic and potentially environmentally dependent, is proactively excluded by the rendering service.

At 140, the remaining portions of the active piece of content that were not actively excluded and any replaced portions (portions that may have been replaced with environmentally and context independent attributes) are rendered to a non-modifiable and stable format for the active piece of content. This version of the active piece of content is consistent and may be relied upon to be deterministically rendered to produce the same content and produce the same visual experience across multiple disparate environments, multiple disparate devices, and multiple disparate media.

In an embodiment, at 150, the rendering service may then present the non-modifiable and stable format of the active piece of content on a target display for consumption by a viewer or requestor. In another case, at 160, the rendering service may send the non-modifiable and stable format of the active piece of content to a printing device or printing system for subsequent output to print media. It is noted that the viewing form of the stable content may be the same as the printed form of the stable content. That is, the rendering of the active piece of content from its stable form can be consistent across environments, across devices, and across media (display/paged media versus paper-based media).

Figure 2:
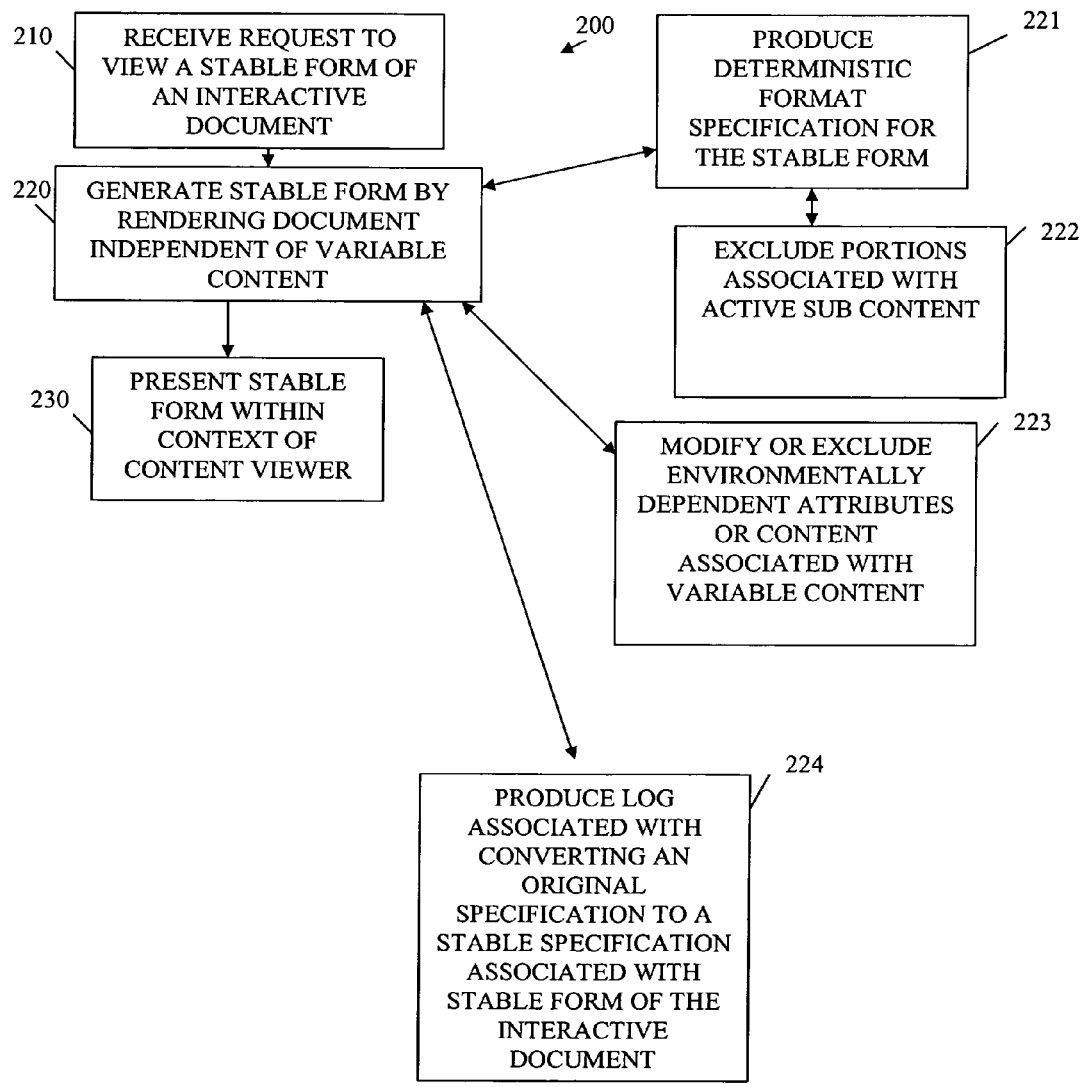
FIG. 2 is a diagram of a method for presenting active content in an environmentally independent format, according to an example embodiment of the invention.

FIG. 2 is a diagram of a method 200 for presenting active content in an environmentally independent format, according to an example embodiment of the invention. The method 200 (hereinafter "presenting service") is implemented in a machine-accessible and readable medium and is accessible over a network. The network may be wired, wireless, or a combination of wired and wireless. The presenting service presents an enhanced or alternative view of the processing associated with the rendering service represented by the method 100 of the FIG. 1.

At 210, the presenting service receives a request to view a stable form of an active document. In some cases, this request may be received from within a content viewer or content editor, where the active document is loaded or where an identifier for the active document is supplied such that the presenting service may acquire the data associated with the active document.

At 220, the presenting service generates a stable form of the active document by rendering or converting data associated with the active document into a format (stable form) that is independent of variable content or variable presentation details defined in the active document. So, at 221, the presenting service parses the data associated with the active document or parses a specification associated with the active document for purposes of producing a deterministic formatted specification for the stable form. The specification defines the rendering of the stable form.

The specification may be in any language format, such as but not limited to, an extensible mark-up language schema definition (XSD), data type definition (DTD), database schema, etc. In performing this processing, the presenting service will exclude portions of the active document that are associated with active sub-content (executable logic embedded in the data associated with the active document). At 223, the presenting service may also modify or actively exclude environmentally dependent attributes or content associated with variable content or variable presentation of content. Again, lists, specifications, tables, policies, or other data structures may be used and evaluated by the presenting service for purposes of determining what is to be excluded and what might be modified for purposes of retaining just environmentally independent content and attributes within the active document in its stable form.

According to an embodiment, at 224, the presenting service may also produce a log associated with converting an original specification associated with the original active document to a stable specification associated with a stable form and version of the active document. This log may be used as an audit trail or for purposes of report generation or notification. It may list each action taken by the presenting service during the conversion and actively identify excluded content, modified attributes, etc.

At 230, the presenting service presents the stable form of the active document within a context of a content viewer. That is, the active content is rendered and presented within a display in its stable form. The viewer of this stable form is assured that what is present in this stable form will remain there across platforms, environments, and media renderings. In this manner, the viewer can rely on this version of the active document as being consistent and stable. This helps facilitate reliability for documents that are dependent upon a stable and non modified version, such as documents that include a signature. So, a signer can be assured that a version of a document he/she signs is not going to change and when it resurfaces it will match with what the signer has recorded and has previously noted.

The stable form may also be managed by the presenting service, such that the stable version is not modifiable and is consistently retrievable with subsequent iterations of the document on demand.

Figure 3:
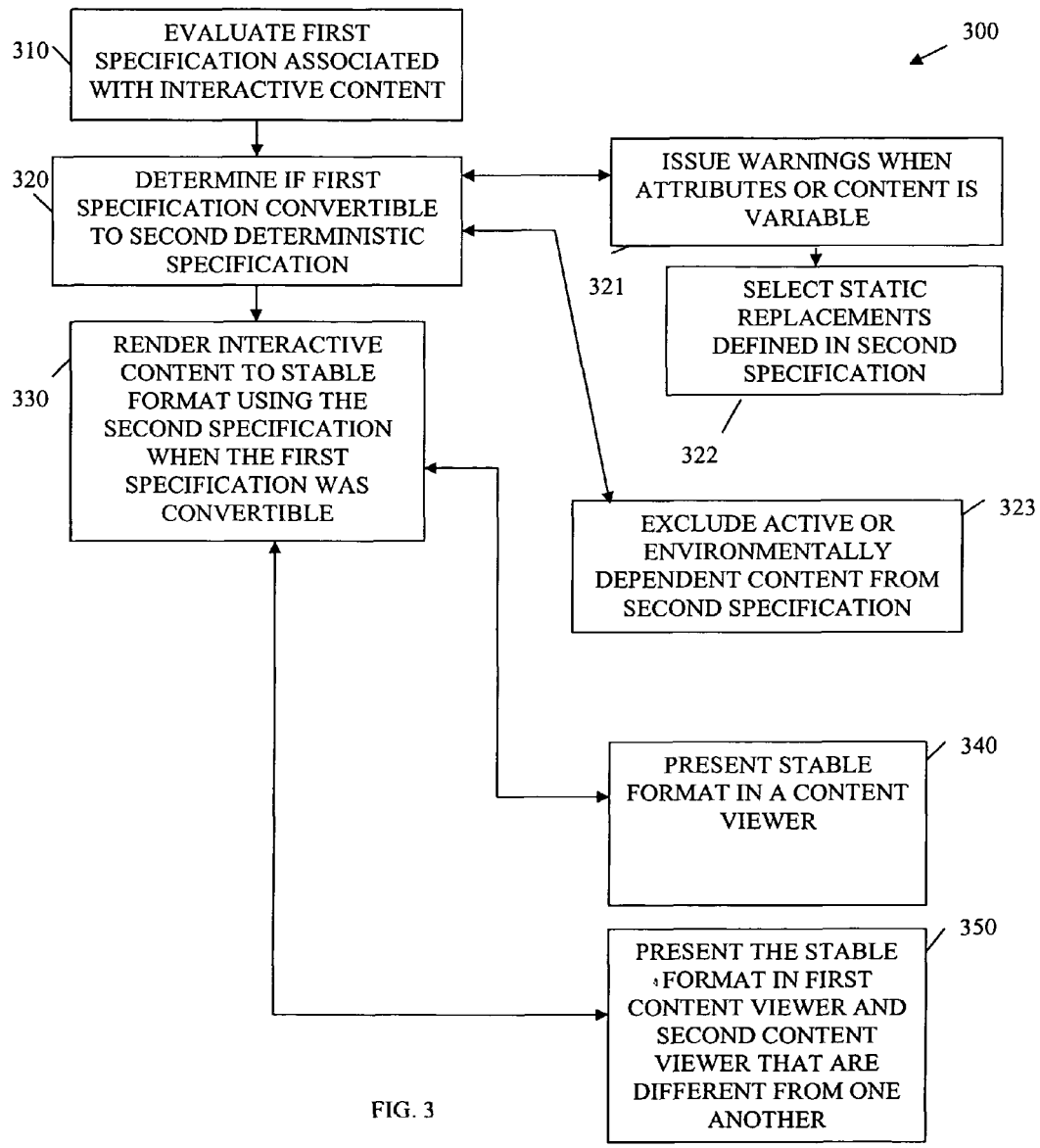
FIG. 3 is a diagram of a method for rendering active content in an environmentally independent format, according to an embodiment of the invention.

FIG. 3 is a diagram of a method 300 for rendering active content in an environmentally independent format, according to an embodiment of the invention. The method 300 is implemented as instructions within a machine-accessible and readable medium and is operational and accessible over a network. The network may be wired, wireless, or a combination of wired and wireless. The instructions may implement, among other things, the methods 100 and 200 of the FIGS. 1 and 2 and provide for other beneficial features described herein and below.

The instructions may be stored on removable media and the removable media may be interfaced to a machine where the instructions are uploaded and processed to perform the processing depicted in FIG. 3. Alternatively, the instructions may be prefabricated within memory and/or storage of a machine and executed. In still other cases, the instructions may be downloaded from one network machine to another network machine and processed. In still more cases, the instructions may be executed remotely on one network machine at the direction of another network machine or its services.

At 310, the instructions evaluate a first specification associated with active content. That is, active content is in some electronic format or language and a definition of that content is defined in metadata, such as a specification (e.g., XSD, schema, DTD, etc.). The instructions may then use a parser or other techniques to evaluate the first specification for the active content being processed for purposes of recognizing attributes and data types, which the instructions knows can be rendered deterministically independent of any particular environment or device.

At 320, the instructions determine, in response to the evaluation, whether the first specification is convertible to a second deterministic specification. A deterministic specification is one in which a version of the active content can be rendered independent of a device, media, or environment in which it may be subsequently rendered. That is, a deterministic specification can be used to render the active content in a same visual and substantive format across platforms, environments, media, and devices. A rendered version of the active content produced from the deterministic specification is the same regardless of its rendered environment or context.

According to an embodiment, at 321, the instructions may also issue warnings when attributes or content are determined to be variable from the first specification. These warnings may be screen messages or may be recorded to a log for subsequent consumption and usage. In some cases, at 322, the instructions may select static and stable replacements for some attributes determined to be potentially problematic in the first specification and record these replacements in the second and stable specification. The replacements are deterministic in nature, which means they will produce a rendering from the second specification in a consistent manner independent of any particular target environment, target media, or target device.

Also, at 323, the instructions proactively exclude active or environmentally dependent content from the second specification. This again, permits the second specification to be defined in terms of deterministic definitions and processing, which is consistently reproducible.

At 330, the instructions render the active content to a stable format using the second specification, if the second specification was in fact producible or convertible from the first specification associated with the active content. If the first specification was not convertible then the instructions will stop processing and send notifications that the active content is incapable of being deterministically rendered.

In an embodiment, at 340, the instructions may present the stable format in a content viewer for consumption by a viewer. Additionally, the instructions, at 350, may present the stable format in a first content viewer and simultaneously present the stable format in a second content viewer. The two content viewers may be associated with different versions of the same editor, different editors altogether, different environments, and/or different devices or processing contexts associated with the two content viewers. So, the second specification may be repeatedly used to produce a stable and consistent substantive and viewing version of the active content, which is independent of any particular environment, device, or media.

Figure 4:
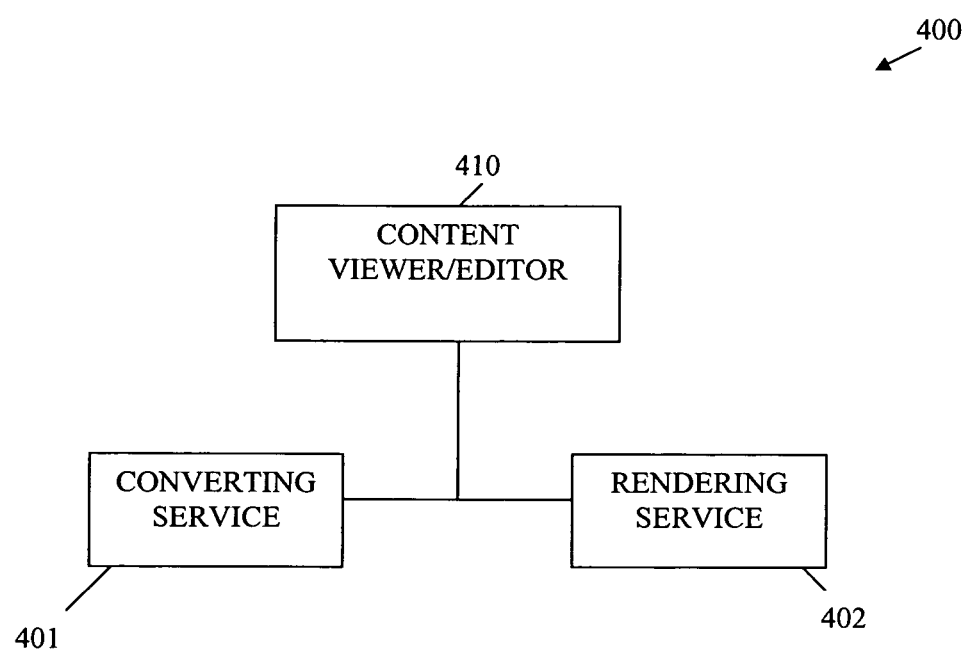
FIG. 4 is a diagram of a deterministic content rendering system, according to an example embodiment of the invention.

FIG. 4 is a diagram of a deterministic content rendering system 400, according to an example embodiment of the invention. The deterministic content rendering system 400 is implemented in a machine-accessible and readable medium and is accessible or operational over a network. The network may be wired, wireless, or a combination of wired and wireless. According to an embodiment, the deterministic content rendering system 400 implements, among other things, the methods 100, 200, and 300 depicted and described within the contexts of FIGS. 1-3.

The deterministic content rendering system 400 includes a converting service 401 and a rendering service 402. In some embodiments, the converting service 401 and the rendering service 402 may be integrated with or callable from a modified content viewer/editor 410. Each of these will now be discussed in turn.

The converting service 401 is implemented as software instructions that evaluate active content or active documents and/or their specifications for purposes of determining if the data is capable of being deterministically rendered independent of any particular environment, media, or device. The converting service 401 retains the content and attributes that are deterministic from the original data associated with the active content and either discards the non-deterministic data or, if permissible, replaces some attributes associated with non-deterministic data, with deterministic replacements.

In an embodiment, the converting service 401 is adapted to select universal presentation attributes for inclusion in a specification associated with a deterministic version of active content when some existing attributes detected in a first specification associated with the active content are resolved to be variable or non deterministic and where such replacement is permissible.

According to an embodiment, the converting service 401 is also adapted to raise warnings when a number of the presentation attributes detected in a first specification associated with the active content are identified as being non universal or non standard. Such detection can occur via preconfigured policy evaluations, other global specifications, other metadata, table lookups, etc.

In still another embodiment, the converting service 401 is adapted to independently maintain a second specification for the active content independent of the first specification. The first specification is an original specification for a non-deterministic version of the active content and the second specification is a deterministic version of the active content. The second specification may be locked down and carried with the document as metadata, such that any particular point in time a stable form of the active content may be rendered to a target environment, target media, or target device.

The converting service 401 may also log actions that it takes when it converts a first specification of the active document to a second specification. This may be used for auditing, reporting, or notifying interested parties or other automated services.

The rendering service 402 receives the second specification from the converting service 401 and renders the active content into a stable or static form or format that is independent of environment, media, or device. The rendering service 401 may also present the rendered active content on any desired target device, such as a display.

According to an embodiment, the converting service 401 and the rendering service 402 are integrated within or processed within a context of a content viewer/editor 401. So, the converting service 401 and the rendering service 402 may be implemented as integrated enhancements to existing viewers or editors to provide the added functionality of maintaining a version of an active document or piece of active content in a static, stable, non-modifiable, and deterministic format that consistently is capable of being rendered to a same substantive and visual format having the same consistent content. This also permits a user to easily compare two different versions visually or via other content comparing tools or services.

In still another embodiment, the rendering service 402 may maintain versions of a document having the active content based on signatures that appear in the documents. In this manner, a user may select a particular signature in a particular version of a document that the user is viewing and the rendering service may produce a stable form and version of the document as it existing when that particular signature was generated or signed for the document. In this manner, users may role back to stable forms of the document and see how that document appeared when a particular signature was used to sign the document.

It is also noted that techniques presented herein and above permit context-dependent information associated with content to be ignored in a rendering to a target environment or platform or to be converted consistently to context-independent information that is consistently rendered to the target environment in a same format. In some cases, some variations may be permissible. For example, content associated with video or animation may be viewed from different points in time and content associated with three dimensions may be viewed from different perspectives. However, in these cases each point in time and each perspective will present the same consistent viewing of the content for that point in time or that perspective.

The above description is illustrative, and not restrictive. Many other embodiments will be apparent to those of ordinary skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A method comprising:
   receiving a request to view a stable form of an active document from a content viewer, the active document including variable sub-content and deterministic sub-content;
   determining the variable sub-content is rendered with a plurality of visual appearances by a plurality of renderers;
   determining the deterministic sub-content is rendered with a single visual appearance by the plurality of renderers;
   generating the stable form of the active document by rendering the active document with the deterministic sub-content and without the variable sub-content; and
   presenting the stable form of the active document within the content viewer.

2. The method of claim 1, wherein the generating of the stable form of the active document includes producing a deterministic format specification for the stable form of the active document.

3. The method of claim 1, wherein the generating of the stable form of the active document includes omitting the variable sub-content from the stable form of the active document.

4. The method of claim 1 further comprising:
   determining that a presentation attribute of the variable sub-content fails to conform to a format specification;
   substituting a default attribute for the presentation attribute; and modifying the variable sub-content with the default attribute; wherein the stable form of the active document includes the modified variable sub-content.

5. The method of claim 1 further comprising: converting an original specification of the active document to a stable specification corresponding to the stable form of the active document.

6. A machine-accessible storage medium comprising instructions that, when executed by one or more processors of a machine, cause the machine to perform a method comprising:
   receiving a request to view a stable form of an active document from a content viewer, the active document including variable sub-content and deterministic sub-content;
   determining the variable sub-content is rendered with a plurality of visual appearances by a plurality of renderers;
   determining the deterministic sub-content is rendered with a single visual appearance by the plurality of renderers;
   generating the stable form of the active document by rendering the active document with the deterministic sub-content and without the variable sub-content; and
   presenting the stable form of the active document within the content viewer.

7. The machine-accessible storage medium of claim 6, wherein the generating of the stable form of the active document includes producing a deterministic format specification for the stable form of the active document.

8. The machine-accessible storage medium of claim 6, wherein the generating of the stable form of the active document includes omitting the variable sub-content from the stable form of the active document.

9. The machine-accessible storage medium of claim 6, wherein the method further comprises:
   determining that a presentation attribute of the variable sub-content fails to conform to a format specification;
   substituting a default attribute for the presentation attribute; and modifying the variable sub-content with the default attribute; wherein the stable form of the active document includes the modified variable sub-content.

10. The machine-accessible storage medium of claim 6, wherein the method further comprises:
    converting an original specification of the active document to a stable specification corresponding to the stable form of the active document.

11. A system comprising:
    a machine to execute instructions; and
    a machine-readable medium storing the instructions thereon, the instructions, when executed by the machine, to cause the machine to perform steps including;
    receiving a request to view a stable form of an active document from a content viewer, the active document including variable sub-content and deterministic sub-content;
    determining the variable sub-content is rendered with a plurality of visual appearances by a plurality of renderers;
    determining the deterministic sub-content is rendered with a single visual appearance by the plurality of renderers;
    generating the stable form of the active document by rendering the active document with the deterministic sub-content and without the variable sub-content; and presenting the stable form of the active document within the content viewer.

12. The system of claim 11, wherein the generating of the stable form of the active document includes producing a deterministic format specification for the stable form of the active document.

13. The system of claim 11, wherein the generating of the stable form of the active document includes omitting the variable sub-content from the stable form of the active document.

14. The system of claim 11, wherein the steps further include:
   determining that a presentation attribute of the variable sub-content fails to conform to a format specification;
   substituting a default attribute for the presentation attribute; and modifying the variable sub-content with the default attribute; wherein
   the stable form of the active document includes the modified variable sub-content.

15. The system of claim 11, wherein the steps further include:
   converting an original specification of the active document to a stable specification corresponding to the stable form of the active document.

* * * * *